Patented Feb. 8, 1927.

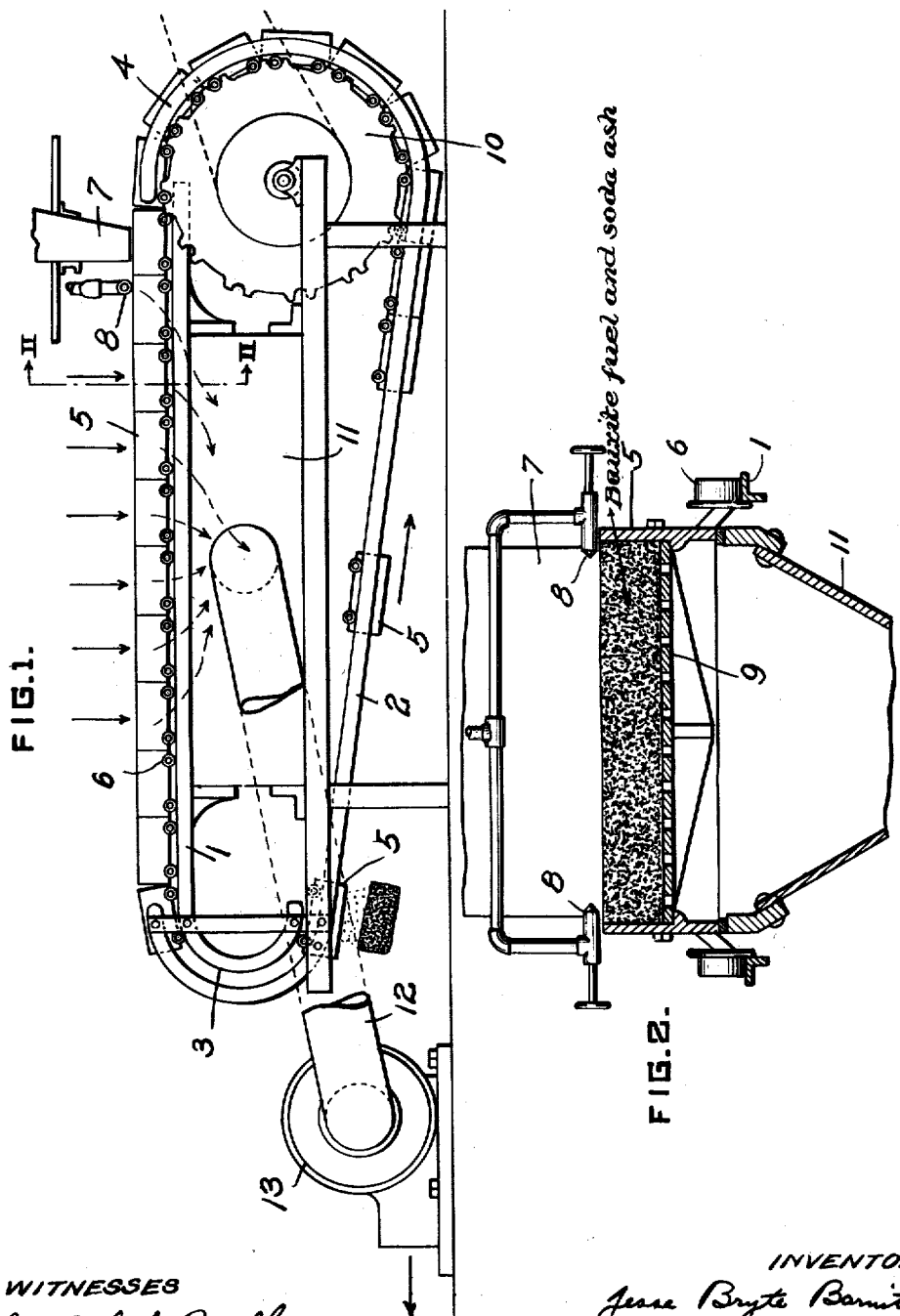

1,616,674

UNITED STATES PATENT OFFICE.

JESSE BRYTE BARNITT, OF PITTSBURGH, PENNSYLVANIA, ASSIGNOR TO ALUMINUM COMPANY OF AMERICA, OF PITTSBURGH, PENNSYLVANIA, A CORPORATION OF PENNSYLVANIA.

PROCESS OF PRODUCING SODIUM ALUMINATE.

Application filed January 21, 1926. Serial No. 82,751.

The invention relates to the dry process production of sodium aluminate from the mixture of soda ash and an aluminous material such as bauxite.

It is well known that the commercial value of sodium aluminate depends almost entirely upon its content of water-soluble alumina, which in turn is brought about in the dry process production of sodium aluminate by proper calcination of a uniform ground mixture of aluminous material and soda ash. According to prior practice the calcination of this mixture is effected in either a rotary kiln in which the mixture is tumbled while being heated, or a reverberatory furnace provided with means for agitating the mixture. In both types of furnaces pulverized coal or atomized fuel oil is usually used as fuel.

This practice has several disadvantages which materially affect the quality of the product and the cost of its production. For example, an inherent characteristic of the practice is that the agitation of the mixture tends to so fractionate or stratify its ingredients that its intimate nature is destroyed. This necessarily diminishes the extent of reaction between the ingredients and correspondingly reduces the water-soluble alumina content and hence the quality of the sodium aluminate. The same ultimate result, namely, the reduction of the water-soluble alumina content of the sodium aluminate, is brought about and aggravated by dust losses due, among other causes, to the agitation of the mixture, to the draft created by the products of combustion, and to the evolution of carbon dioxide from the dry mass during the reaction.

In addition to the foregoing, there are further prejudicial characteristics of the prior practice which are to a large extent incident to the manner of heating the mixture. In the use of either a reverberatory furnace or a rotary kiln it requires from six to twelve hours to complete the reaction, a matter which requires the consumption of a large amount of fuel and adds materially to the operating cost. Also, it is difficult to maintain uniform temperatures throughout the mass of the mixture, and when the mixture is overheated there results a partial fusion of the soda ash which produces a sticky mass, a segregation of the ingredients of the charge, and the formation of sodium aluminate of inferior quality.

The object of this invention is to provide a dry process for producing sodium aluminate which overcomes the prejudicial characteristics of the prior process, and a process whereby porous sodium aluminate of high quality and maximum solubility in water may be economically produced.

The invention is predicated primarily upon my discovery that its stated objects may be attained by forming an intimate porous mixture of an aluminous material, soda ash and fuel, and, while the particles of the mixture are in a relatively quiescent state, rapidly burning the fuel of the mixture.

In the practice of the invention an aluminous material such as bauxite is first ground to approximately 80 mesh and is then intimately mixed with soda ash and fuel,—soda ash in an amount necessary to effect to the maximum extent the desired reaction, and fuel in the required amount to produce the necessary heat for effecting the reaction. While various forms of fuel may be mixed with the reacting ingredients of the mixture, it is preferred to use finely crushed coal or coke or both. Saw dust or shaving may also be used, either alone or mixed with finely crushed coal or coke. When, as preferred, dry finely crushed fuel is mixed with the reacting ingredients, the mixture is preferably moistened with water to about the consistency of sand when prepared for molding, which moistening prevents dust losses and renders the mixture sufficiently porous to permit rapid ignition of the admixed fuel, and to also permit the passage of air and products of combustion through the mass. After the moist intimate mixture of the reacting ingredients and fuel has been prepared it is preferably spread on a suitable grate in a layer of suitable thickness, say from four to eight inches, and the fuel, preferably at the top side of the mixture, is ignited and caused to burn rapidly from its place of ignition through the body or layer of the mixture.

It will be understood that the relative proportions of the mixture are determined largely by the kind of aluminous material and fuel used. By way of illustration and not of limitation, I have found a suitable mixture of bauxite, soda ash and finely crushed coal to be in the ratio of 1000 pounds of bauxite containing about 60% aluminum oxide, to 760 pounds of soda ash to 340 pounds of finely crushed coal. When the fuel of this mixture is burned in the manner explained, the reaction between the bauxite and soda ash is completed within a period of ten minutes, the mixture being formed in a layer five inches thick. The sodium aluminate produced by burning the finely crushed coal of this mixture may have a content of more than 50% of water-soluble alumina and is very porous and granular.

While the process may be practiced on various forms of apparatus, it may be advantageously practiced on the well known Dwight and Lloyd type of ore sintering apparatus, one form of which is somewhat diagrammatically illustrated in the accompanying drawings, of which Fig. 1 is a composite side and vertical sectional view of the apparatus, and Fig. 2 a transverse sectional view taken on the line II—II, Fig. 1.

This apparatus comprises a guide consisting of an upper horizontal section 1, a lower downwardly inclined section 2 and end connecting end sections 3 and 4, the guide forming a track or runway for a plurality of cars or pallets 5 provided at their sides with rollers 6 which rest upon or are engaged by the guides. Arranged above and at the right hand end of the guide there is a hopper 7 for depositing the mixture on grate bottoms 9 of the cars as they pass beneath the lower end of the hopper. Adjacent to the hopper there are liquid or gaseous fuel burners 8 which ignite the fuel on the upper side of a layer of the mixture as the cars containing the mixture pass beneath the burners. The cars are moved beneath the hopper and from the right to the left hand side of the upper guide section 1 by means of a suitable driven sprocket 10 which engages the roller 6 of the cars and move them from the lower right hand end of the inclined guide section 2 upwardly and upon its horizontal section 1. At the left of the burners 8 arranged immediately below guide section 1 there is an open top suction box 11 connected by a pipe 12 to a fan or blower 13 for creating a suction or forced draft downwardly through the layers of the mixture in cars 5.

In the use of this apparatus sprocket wheel 10 is continuously driven, fan 13 is continuously operated, burners 8 burn continuously and the mixture is supplied to the cars as they pass beneath hopper 7. The rotation of sprocket 10 is at such rate of speed that during the time which elapses while a car passes from the right to the left end of suction box 11 the fuel of the mixture will be entirely burned and the reaction of the bauxite and soda ash completed. The resulting sodium aluminate then cools as the car moves on guide 1 beyond the left end of the suction box. When a car reaches guide section 3 it moves rapidly downwardly and dumps its cooled granular mass in the manner indicated.

In the practice of this process the intimate mixture of the aluminous material and soda ash remains undisturbed, and accordingly there is neither stratification of the ingredients of the mixture nor dust losses. This results in the production of sodium aluminate having a very high content of water-soluble alumina. The amount of fuel required for treating a unit volume of a mixture of bauxite and soda ash is about one-fifth that required when sodium aluminate is formed in either a rotary kiln or reverberatory furnace, which effects a very large saving. In addition to this improvement in the quality of the sodium aluminate and its lowered cost of production, the sodium aluminate having been uniformly heated has the further advantageous characteristic of being very porous and granular so that its requires no grinding to prepare it for its various commercial uses or for subsequent refining for the removal of its alumina content for use in the production of aluminum.

While throughout the specification, and also in the appended claims, the product of the process is designated as a porous sintered mass of sodium aluminate, it will of course be understood that it may contain other components if crude bauxite is used as the source of aluminous material, or that it may consist substantially of sodium aluminate if purified alumina is used as the aluminous material of the charge.

According to the provisions of the patent statutes, I have explained the principle and mode of operation of my invention, and have given specific directions of how it may be advantageously practiced. However, I desire to have it understood that, within the scope of the appended claims, the invention may be practiced otherwise than as specifically described.

I claim:

1. The process of producing sodium aluminate, comprising forming an intimate porous mixture of an aluminous material, soda ash and fuel, and while the components of the mixture are in a relative quiescent state rapidly burning the fuel of said mixture to produce a porous sintered mass of sodium aluminate.

2. The process of producing sodium aluminate comprising forming an intimate porous and moist mixture of an aluminous material, soda ash and fuel, and while the components of the mixture are in a relative quiescent state rapidly burning the fuel of said mixture to cause other ingredients thereof to react to form a porous sintered mass of sodium aluminate.

3. The process of producing sodium aluminate comprising forming an intimate porous and moist mixture of an aluminous material, soda ash and carbonaceous finely divided fuel, and while the components of the mixture are in a relative quiescent state rapidly burning the fuel of the mixture to produce a porous sintered mass of sodium aluminate.

4. The process of producing sodium aluminate, comprising forming an intimate porous and moist mixture of ground bauxite, soda ash and fuel, and while the components of the mixture are in a relative quiescent state burning the fuel of said mixture to produce a porous sintered mass of sodium aluminate.

5. The process of producing sodium aluminate, comprising forming an intimate porous and moist mixture of ground bauxite, soda ash and finely divided carbonaceous fuel, and while the components of the mixture are in a relative quiescent state rapidly burning the fuel of the mixture to cause the other ingredients thereof to react to form a sintered mass of sodium aluminate having a high content of water-soluble alumina.

6. The process of producing sodium aluminate comprising forming an intimate porous and moist mixture of an aluminous material, soda ash and fuel, forming a layer of the mixture upon a grate, and while the components of the mixture are in a relative quiescent state igniting said fuel at one side of the layer of the mixture and causing the fuel to burn rapidly from its said place of ignition through the body of the mixture to produce a porous sintered mass of granular sodium aluminate.

7. The process of producing sodium aluminate comprising forming an intimate porous and moist mixture of granular bauxite, soda ash and carbonaceous fuel, forming a layer of the mixture upon a grate, and while the particles of the mixture are in a relative quiescent state igniting said fuel at one side of the layer of the mixture and causing the fuel to burn rapidly from its said place of ignition through the body of the mixture to form a porous sintered mass of sodium aluminate.

In testimony whereof, I sign my name.

JESSE BRYTE BARNITT.

thereof to react to form a porous sintered mass of sodium aluminate.

3. The process of producing sodium aluminate comprising forming an intimate porous and moist mixture of an aluminous material, soda ash and carbonaceous finely divided fuel, and while the components of the mixture are in a relative quiescent state rapidly burning the fuel of the mixture to produce a porous sintered mass of sodium aluminate.

4. The process of producing sodium aluminate, comprising forming an intimate porous and moist mixture of ground bauxite, soda ash and fuel, and while the components of the mixture are in a relative quiescent state burning the fuel of said mixture to produce a porous sintered mass of sodium aluminate.

5. The process of producing sodium aluminate, comprising forming an intimate porous and moist mixture of ground bauxite, soda ash and finely divided carbonaceous fuel, and while the components of the mixture are in a relative quiescent state rapidly burning the fuel of the mixture to cause the other ingredients thereof to react to form a sintered mass of sodium aluminate having a high content of water-soluble alumina.

6. The process of producing sodium aluminate comprising forming an intimate porous and moist mixture of an aluminous material, soda ash and fuel, forming a layer of the mixture upon a grate, and while the components of the mixture are in a relative quiescent state igniting said fuel at one side of the layer of the mixture and causing the fuel to burn rapidly from its said place of minate comprising forming an intimate to produce a porous sintered mass of granular sodium aluminate.

7. The process of producing sodium aluminate comprising forming an intimate porous and moist mixture of granular bauxite, soda ash and carbonaceous fuel, forming a layer of the mixture upon a grate, and while the particles of the mixture are in a relative quiescent state igniting said fuel at one side of the layer of the mixture and causing the fuel to burn rapidly from its said place of ignition through the body of the mixture to form a porous sintered mass of sodium aluminate.

In testimony whereof, I sign my name.

JESSE BRYTE BARNITT.

---

Certificate of Correction.

Patent No. 1,616,674.           Granted February 8, 1927, to

JESSE BRYTE BARNITT.

It is hereby certified that error appears in the printed specification of the above-mentioned patent requiring correction as follows: Page 3, claim 6, strike out line 40 and insert instead *ignition through the body of the mixture;* and that the said Letters Patent should be read with this correction therein that the same may conform to the record of the case in the Patent Office.

Signed and sealed this 15th day of March, A. D. 1927.

[SEAL.]

M. J. MOORE,
*Acting Commissioner of Patents.*

Certificate of Correction.

Patent No. 1,616,674.                                  Granted February 8, 1927, to

JESSE BRYTE BARNITT.

It is hereby certified that error appears in the printed specification of the above-mentioned patent requiring correction as follows: Page 3, claim 6, strike out line 40 and insert instead *ignition through the body of the mixture;* and that the said Letters Patent should be read with this correction therein that the same may conform to the record of the case in the Patent Office.

Signed and sealed this 15th day of March, A. D. 1927.

[SEAL.]                                                       M. J. MOORE,
*Acting Commissioner of Patents.*